US008184143B2

(12) United States Patent
Garcia

(10) Patent No.: US 8,184,143 B2
(45) Date of Patent: May 22, 2012

(54) SIMULATED REFLECTIVE DISPLAY

(75) Inventor: Enrique Garcia, Malmo (SE)

(73) Assignee: Sony Mobile Communications AB, Lund (SE)

( * ) Notice: Subject to any disclaimer, the term of this patent is extended or adjusted under 35 U.S.C. 154(b) by 527 days.

(21) Appl. No.: 12/147,719

(22) Filed: Jun. 27, 2008

(65) Prior Publication Data

US 2009/0322909 A1 Dec. 31, 2009

(51) Int. Cl.
*H04N 7/14* (2006.01)
*H04N 5/262* (2006.01)
*G09G 5/00* (2006.01)

(52) U.S. Cl. ................ 348/14.03; 348/239; 348/333.12; 345/629; 345/647

(58) Field of Classification Search ............. 348/14.01, 348/14.02, 14.03, 14.1, 239, 333.01, 333.02, 348/333.12; 345/581, 629, 647
See application file for complete search history.

(56) References Cited

U.S. PATENT DOCUMENTS

| H716 H | * | 12/1989 | McDonald et al. | 345/173 |
|---|---|---|---|---|
| 5,295,199 A | * | 3/1994 | Shino | 345/581 |
| 5,325,200 A | * | 6/1994 | Jaffray et al. | 348/586 |
| 5,706,031 A | * | 1/1998 | Brendzel et al. | 345/172 |
| 6,088,018 A | * | 7/2000 | DeLeeuw et al. | 345/156 |
| 6,452,593 B1 | * | 9/2002 | Challener | 345/419 |
| 7,471,301 B2 | * | 12/2008 | Lefevre | 345/632 |
| 7,982,751 B2 | * | 7/2011 | Stotts et al. | 345/633 |
| 2002/0154142 A1 | * | 10/2002 | Thomason | 345/629 |
| 2005/0075167 A1 | * | 4/2005 | Beaulieu et al. | 463/32 |
| 2008/0165267 A1 | * | 7/2008 | Cok | 348/333.01 |

FOREIGN PATENT DOCUMENTS

WO WO 2006/024873 3/2006

OTHER PUBLICATIONS

Anderson et al., "Embedded Reflection Mapping", XP-002366141, 2003, 1 page.
Notification of Transmittal of the International Search Report and the Written Opinion of the International Searching Authority, or the Declaration corresponding to PCT/IB2008/055494, dated May 8, 2009, 14 pages.

* cited by examiner

*Primary Examiner* — Lin Ye
*Assistant Examiner* — Chriss Yoder, III
(74) *Attorney, Agent, or Firm* — Snyder, Clark, Lesch & Chung, LLP

(57) ABSTRACT

A method may be performed by a device having a camera and a display. The method may include identifying a graphical element to be presented on the display, capturing an image of an area in front of the display, determining information for distorting the captured image based on the graphical element, distorting the captured image based on the determined information. The distorted image may be combined with the graphical element on the display.

19 Claims, 6 Drawing Sheets

SIMULATED REFLECTIVE DISPLAY

BACKGROUND

The proliferation of electronic devices, such as handheld and portable devices and other computing devices, continues to grow tremendously. A majority of these devices include some kind of display to provide a user with visual information. In some instances these devices may display graphical images with a metallic appearance or glossy properties to, for example, enhance the user experience.

SUMMARY

A method may be performed by a device having a camera and a display. The method may include identifying a graphical element to be presented on the display; capturing an image of an area in front of the display; determining information for distorting the captured image based on the graphical element; distorting the captured image based on the determined information; and displaying the distorted image combined with the graphical element on the display.

Additionally, capturing the image may include periodically capturing still images of the area in front of the display.

Additionally, capturing the image may include capturing video of the area in front of the display.

Additionally, determining information for distorting the captured image may include determining a geometric shape of the graphical element; and distorting the captured image may include conforming the captured image to simulate a reflection from the geometric shape.

Additionally, distorting the captured image may include changing an orientation of the captured image to simulate a reflective surface.

Additionally, distorting the captured image may include applying a degree of reflectivity to the captured image.

Additionally, the capturing, distorting and displaying may be repeated at particular intervals.

In another implementation, a device may include a display to display information; a camera to capture an image of an area in front of the display; and processing logic. The processing logic may identify a graphical element for presentation on the display; distort the captured image to simulate a reflection of the captured image; combine the distorted image and the graphical element to create a reflective graphical element; and present the reflective graphical element on the display.

Additionally, the camera may periodically capture still images of the area in front of the display.

Additionally, the camera may capture video of the area in front of the display.

Additionally, the processing logic to identify the graphical element may include determining a geometric shape of the graphical element; and where the processing logic to distort the captured image may include conforming the captured image to simulate a reflection from the geometric shape.

Additionally, the display is a touch screen and the reflective graphical element may be altered based on a user's touch.

Additionally, an orientation of the captured imaged may be changed to simulate a reflective surface.

Additionally, the device may also include a housing, where the camera and the display may be located on separate portions of the housing.

Additionally, the device may also include a housing, where the camera may be located within the housing underneath a portion of the display.

In another implementation, a device may include means for identifying a graphical element that has a reflective surface; means for capturing an image of the area in front of a display facing a user; means for altering the captured image to emulate a reflection of an object from the perspective of the user; and means for displaying the altered image on the reflective surface of the graphical element.

Additionally, the altered image may be replaced with another altered image at regular intervals.

Additionally, the means for identifying a graphical element may include determining a geometric shape of the graphical element; and the means for altering the captured image may include conforming the captured image to simulate a reflection from the geometric shape.

Additionally, the means for altering the captured image may include means for changing an orientation of the captured image to simulate a reflective surface.

Additionally, the means for altering the captured image may include means for applying a degree of reflectivity to the captured image.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Figure 1:
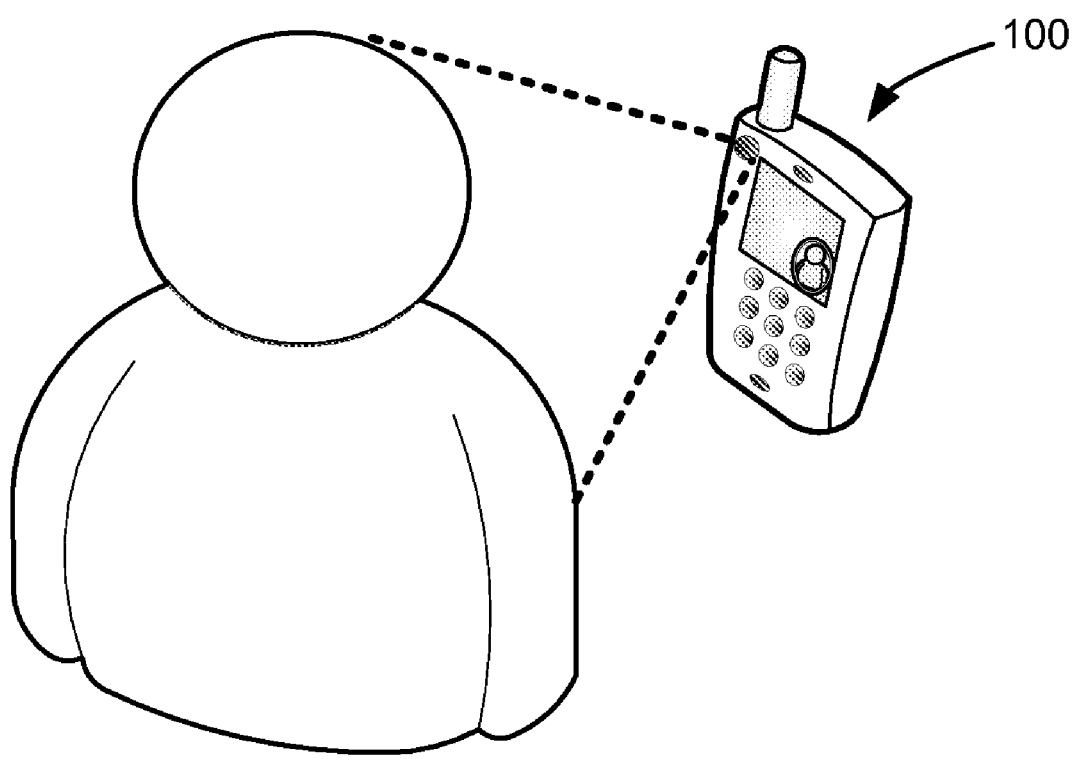
FIG. 1 is a schematic illustrating an implementation of the systems and methods described herein.

Generating a reflective appearance on a computer display has become desirable for enhancing a user experience. For example, a command button or another widget on a graphical user interface may be depicted as crystallized glass, metal, or other material that may have reflective properties. Because a computer display with a reflective surface is generally not desirable, reflective properties, when desired, must be simulated. While conventional displays may include images with a metallic, shiny or glossy appearance, the images do not emulate a true reflective appearance because they do not show an indication of an actual image that would be reflected in the reflective portion of the display. FIG. 1 provides an exemplary illustration of how systems and methods described herein may use a camera to collect images of whatever is in front of a computer display and apply the images to simulate a reflective surface on a portion of a display, such as on a command button or another graphical element. Referring to FIG. 1, an electronic device 100, such as a cellular radiotelephone including a camera, may capture an image of the area in front of the device's display (such as, for example, the face of a user and surrounding background) and apply the image to graphical elements on the display to give the appearance of a reflection. In some implementations, the captured images may be positioned on the display and/or distorted to provide the appearance of a reflection off a two- or three-dimensional object.

Exemplary Device

Figure 2A:
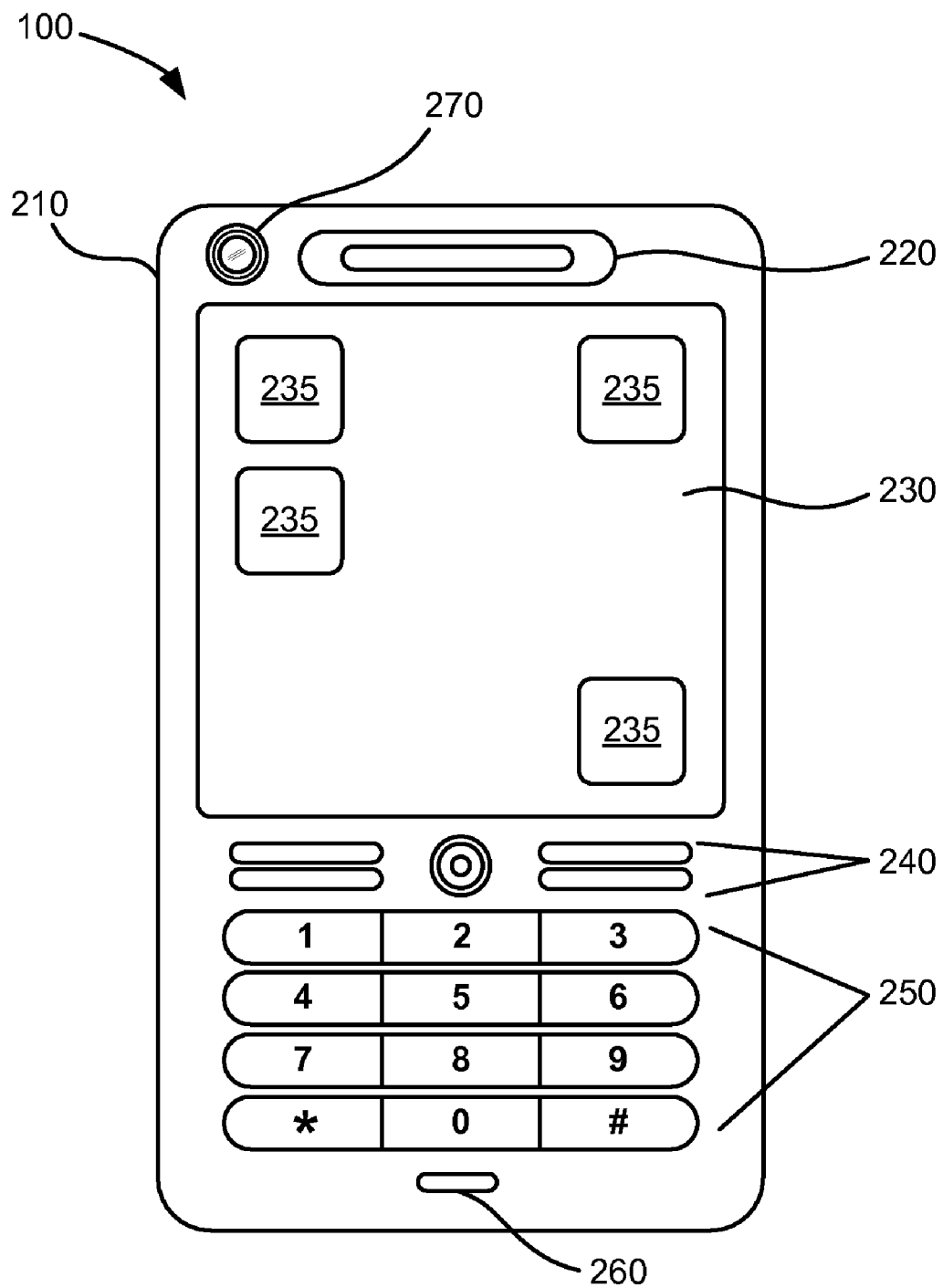
FIG. 2A is a diagram of an exemplary electronic device in which methods and systems described herein may be implemented.

FIG. 2A is a diagram of exemplary electronic device 100 in which methods and systems described herein may be implemented. Implementations are described herein in the context of an electronic device having a display. As used herein, the term "electronic device" may include a cellular radiotelephone; a Personal Communications System (PCS) terminal that may combine a cellular radiotelephone with data processing, facsimile and data communications capabilities; a PDA that can include a radiotelephone, pager, Internet/Intranet access, Web browser, organizer, calendar and/or a global positioning system (GPS) receiver; a gaming device; a media player device; a digital camera; a desktop, laptop or palmtop computer; or any other device that includes a display. Electronic device 100 may also include communication, media playing, recording, and/or storing capabilities.

Referring to FIG. 2A, electronic device 100 may include a housing 210, a speaker 220, a display 230, control buttons 240, a keypad 250, a microphone 260, and a camera 270. Housing 210 may protect the components of electronic device 100 from outside elements. Housing 210 may be made from thermoplastics, metals, elastomers (e.g., synthetic rubber and/or natural rubber), and/or other similar materials. Speaker 220 may provide audible information to a user of electronic device 100. Speaker 220 may include any component capable of transducing an electrical signal to a corresponding sound wave. For example, a user may listen to music through speaker 220.

Display 230 may provide visual information to the user. Display 230 may include a device that can display signals generated by electronic device 100 as text or images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.). Display 230 may provide, for example, video or still images associated with camera 270. For example, display 230 may present images currently focused on by a lens or view finder of camera 270. Display 230 may also be used to present stored pictures or videos taken by camera 270 and/or received by electronic device 100. As another example, buttons, icons, virtual keys, or other graphical elements (depicted generally as graphical elements 235 in FIG. 2A) may be presented via display 230. Also, display 230 may provide information associated with incoming or outgoing calls, text messages, games, phone books, the current date/time, volume settings, etc., to a user of electronic device 100. In one implementation, display 230 may also serve—in conjunction with a touch panel (not shown)—as a touch screen interface to detect user input when the user interacts with graphical elements 235 displayed on display 230.

Control buttons 240 may also be included to permit the user to interact with electronic device 100 to cause electronic device 100 to perform one or more operations, such as place a telephone call, play various media, access an application, etc. For example, Control buttons 240 may include a shutter key for enabling the user to take a picture with camera 270. Control buttons 240 may also include a dial button, hang up button, play button, etc. One of control buttons 240 may be a menu button that permits the user to view various settings on display 230.

Keypad 250 may also be included to provide input to electronic device 100. Keypad 250 may include a standard telephone keypad. Keys on keypad 250 may perform multiple functions depending upon a particular application selected by the user. Microphone 260 may receive audible information from the user. Microphone 260 may include any component capable of transducing air pressure waves to a corresponding electrical signal.

Camera 270 may enable device 100 to capture and/or store video and/or images (e.g. pictures) of a scene being viewed through the lens of camera 270. Camera 270 may store the pictures/videos in a memory within electronic device 100 and/or other possibly remote locations. Camera 270 may also communicate with processing logic within electronic device 100 to control various aspects with respect to taking and storing pictures/videos, as described in detail below. In some implementations, camera 270 may work in conjunction with a flash (not shown) and other camera accessories, such as light sensors and light sources included in, or operating in conjunction with, electronic device 100. In implementations described herein, camera 270 may be positioned to capture images of what is in front of the display 230 (e.g., a user's face and surrounding area). Camera 270 may be an electronic device that may capture and/or store images and/or video digitally. In one implementation, camera 270 may be a dedicated camera for collecting images for a simulated reflective display. In another implementation, camera 270 may be used both as a conventional camera and as a mechanism for collecting images for a simulated reflective display.

The components described above with respect to electronic device 100 are not limited to those described herein. Other components, such as connectivity ports, memory slots, and/or additional cameras, may be located on electronic device 100, including, for example, on a rear or side panel of housing 210.

Figure 2B:
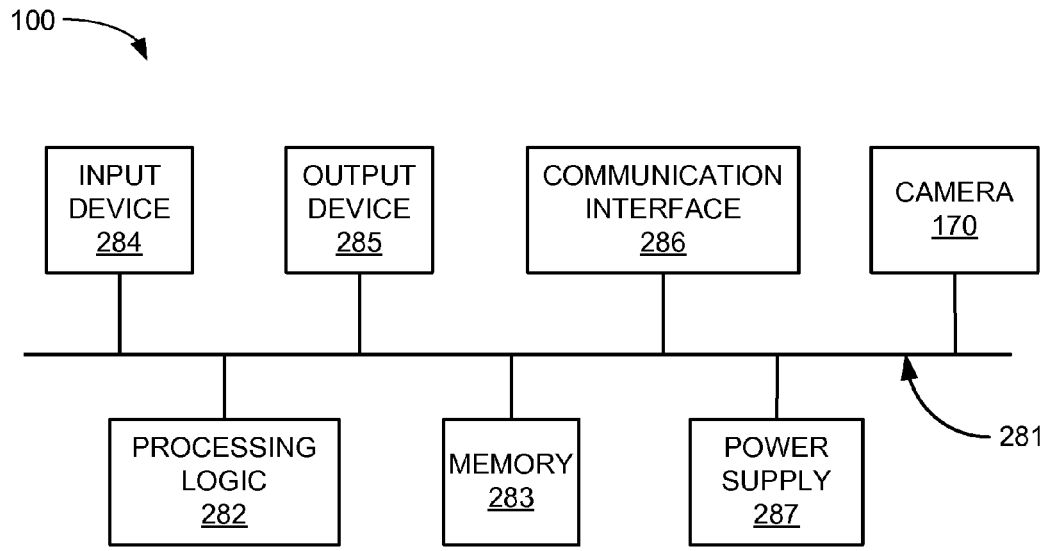
FIG. 2B is a block diagram illustrating components of the electronic device of FIG. 2A according to an exemplary implementation.

FIG. 2B is a diagram illustrating components of electronic device 100 according to an exemplary implementation. Electronic device 100 may include bus 281, processing logic 282, memory 283, input device 284, output device 285, communication interface 286, power supply 287 and camera 270. In other implementations, electronic device 100 may be configured in a number of other ways and may include other or different components. For example, electronic device 100 may include an antenna and one or more modulators, demodulators, encoders, decoders, etc., for processing data.

Bus 281 may permit communication among the components of electronic device 100. Processing logic 282 may include a processor, microprocessor, an application specific integrated circuit (ASIC), a field programmable gate array (FPGA) or the like. Processing logic 282 may execute software instructions/programs or data structures to control operation of electronic device 100 and/or components within electronic device 100. Implementations of electronic device 100 may use an individual processing logic component or multiple processing logic components (e.g., multiple processing logic 282), such as processing logic components operating in parallel.

Memory 283 may include a random access memory (RAM) or another type of dynamic storage device that stores information and instructions for execution by processing logic 282; a read only memory (ROM) or another type of static storage device that stores static information and instructions for use by processing logic 282; a flash memory (e.g., an electrically erasable programmable read only memory (EEPROM)) device for storing data and/or instructions; and/or some other type of magnetic or optical recording medium and its corresponding drive. Memory 283 may be used to store video and/or images captured from camera 270. Memory 283 may also be used to store temporary variables or other intermediate information during execution of instructions by processing logic 282. Instructions used by processing logic 282 may also, or alternatively, be stored in another type of computer-readable medium accessible by processing logic 282. A computer-readable medium may include one or more logical or physical memory devices.

Input device 284 may include a mechanism that permits a user to input information to electronic device 100, such as microphone 260, keypad 250, control buttons 240, a touch screen, a keyboard, a gesture-based device, an optical character recognition (OCR) based device, a joystick, a virtual keyboard, a speech-to-text engine, a mouse, a pen, voice recognition and/or biometric mechanisms, etc. Output device 285 may include a mechanism that outputs information to the user, including a display, such as display 230, a printer, one or more speakers, such as speaker 220, etc.

Communication interface 286 may include any transceiver-like mechanism that enables electronic device 100 to communicate with other devices and/or systems. For example, communication interface 286 may include a modem or an Ethernet interface to a LAN. Communication interface 286 may also include mechanisms for communicating via a network, such as a wireless network. For example, communication interface 286 may include one or more radio frequency (RF) transmitters, receivers and/or transceivers and one or more antennas for transmitting and receiving RF data via a network.

Power supply 287 may include one or more power supplies that provide power to components of electronic device 100. For example, power supply 287 may include one or more batteries and/or connections to receive power from other devices, such as an accessory outlet in an automobile, an external battery, or a wall outlet. Power supply 287 may also include metering logic to provide the user and components of electronic device 100 with information about battery charge levels, output levels, power faults, etc.

Camera 270 may provide video and/or still images that can be viewed on display 230 or another output device 285. Resolution capabilities may range, for example, from high definition video (e.g 1080p and 720p) to lower resolutions such as VGA and below. Video and/or still images may also be integrated into graphical elements 235 (FIG. 1) or other information shown on display 230 via processing logic 282, user interface logic 284, and/or display logic 285.

As will be described in detail below, electronic device 100, consistent with the principles described herein, may perform certain operations relating to displaying simulated reflective surfaces on a display in response to user inputs or in response to processing logic 282. Electronic device 100 may perform these operations in response to processing logic 282 executing software instructions of a display configuration/reprogramming application contained in a computer-readable medium, such as memory 283.

The software instructions may be read into memory 283 from another computer-readable medium or from another device via communication interface 286. The software instructions contained in memory 283 may cause processing logic 282 to perform processes that will be described later. Alternatively, hardwired circuitry may be used in place of or in combination with software instructions to implement processes consistent with the principles described herein. Thus, implementations consistent with the principles of the embodiments are not limited to any specific combination of hardware circuitry and software.

Figure 3:
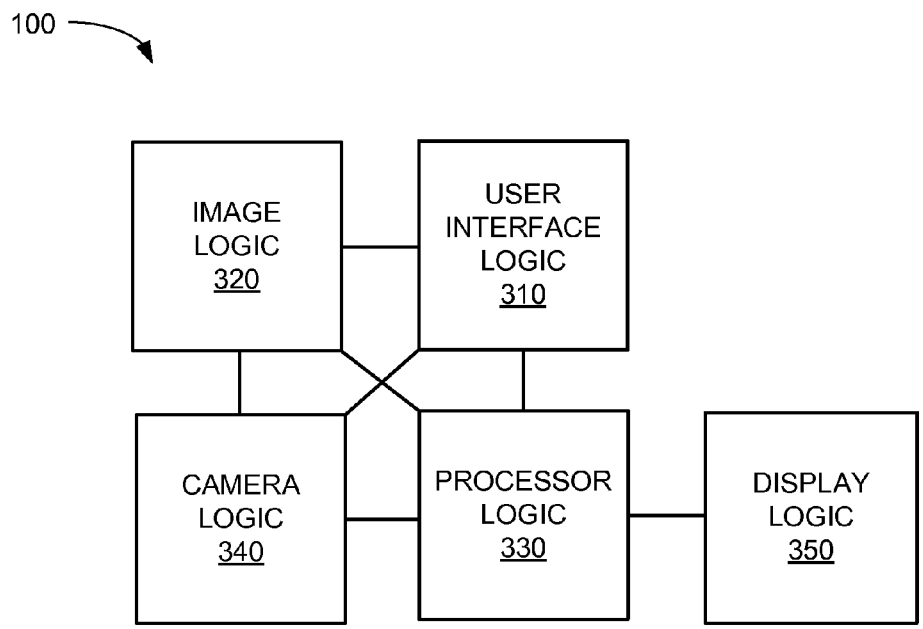
FIG. 3 is functional block diagram of the electronic device of FIG. 2B.

FIG. 3 is a functional block diagram of exemplary components that may be included in electronic device 100. As shown, electronic device 100 may include user interface logic 310, image logic 320, processor logic 330, camera logic 340, and display logic 350. In other implementations, electronic device 100 may include fewer, additional, or different types of functional components than those illustrated in FIG. 3 (e.g., a web browser and/or a touch panel controller). Each of the functional components may be implemented as hardware, software operating on hardware, firmware, or the like.

User interface logic 310 may integrate one or mechanisms from input device 284. User interface logic 310 may be included in processing logic 282. User interface logic 310 may allow the user to receive a menu of options. The menu may allow the user to select various functions or modes associated with applications executed by electronic device 100. User interface logic 310 may allow the user to activate a particular mode, such as a mode defined by an application running in electronic device 100. For example, user interface logic 310 may allow the user to select a "reflective icon mode" to allow electronic device 100 to display simulated reflective graphics on display 230. In some implementations, user interface logic 310 may be application-controlled and may automatically re-configure the appearance of graphical elements (such as graphical elements 235 of FIG. 1) based on an application being launched by the user of electronic device 100, the execution of a function associated with a particular application/device included in electronic device 100 or some other application or function-specific event. In some implementations, one or more aspects of user interface logic 310 may be combined with one or more of processor logic 330 and/or image logic 320.

Image logic 320 may control the appearance of images on reflective graphical elements associated with display 230. For example, image logic 320 may instruct processor logic 330 to change displayed information associated with graphical elements 235 on display 230. Image logic 320 may be included, for example, in processing logic 282. Image logic 320 may receive images (e.g., from camera logic 340) and information regarding the size and shape of a simulated reflective graphical element 235 (e.g., from user interface 310 and/or processor logic 330). In one implementation, image logic 320 may receive distortion characteristics for graphical elements 235 to achieve reflective simulations. In another implementation, image logic 320 may determine information for distorting captured images based on the graphical element. Distortion characteristics may be provided from, for example, processor logic 330 in response to instructions in application software. Distortion characteristics may include features of the simulated reflective graphical element to be displayed, such as, for example, size, geometric shape, viewing angles, degree of reflectivity, etc. Based on the distortion characteristics, image logic 320 may calculate distortions to the images received from camera 270 to provide a realistic reflective appearance on the reflective graphical elements 235.

Processor logic 330 may read and execute software instructions/programs to identify indications of reflective graphical elements to be displayed on display 230. Processor logic 310 may include logic that controls the operation of user interface logic 310, imaged logic 320, camera logic 340, and/or display logic 350. Processor logic 330 may be included, for example, in processing logic 282.

Camera logic 340 may integrate user settings and automated features for capturing images in camera 270. Camera logic 340 may include processing logic to adjust features of camera 270, such as shutter speed, image resolution, video quality and other features. Camera logic 340 may also include processing logic for controlling components related to camera 270, such as, for example, a lens assembly, a proximity sensor, a flash, a range finder, and the like.

Display logic 350 may include processing logic to interpret signals and instructions and a display device (such as display 240) having a display area to provide information to a user of electronic device 100. Implementations of display logic 350 may display still images (e.g., photographs), moving images (e.g., video), text, numbers, symbols, graphical elements, etc. to a user of electronic device 100. Implementations of display logic 320 may include mediums that change properties as light passes through the mediums, or display logic 320 may include mediums that reflect light.

Exemplary Operations

Figure 4A:
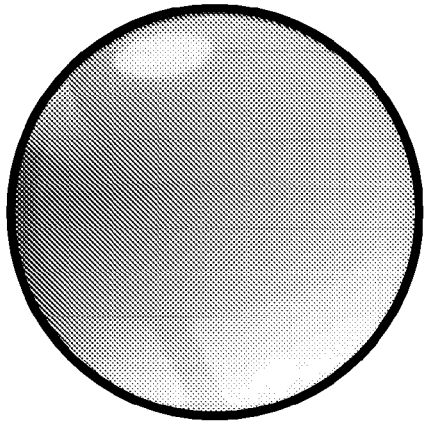
FIG. 4A is a schematic illustrating an existing representation of a shiny graphic image.

FIG. 4A is a schematic illustrating an existing representation of a reflective graphical element. The graphical element may be used, for example, as a command button on a graphical user interface. The image of FIG. 4A uses various shading to give the appearance of a spherical shape and shiny surface. However, the image of FIG. 4A does not provide a reflective appearance, since representations based on images of the area in front of the graphic element are not shown.

Figure 4B:
FIG. 4B is a diagram of a simulated reflective graphical image according to the methods and systems described herein.

FIG. 4B is a schematic of an exemplary simulated reflective graphical element according to the systems and methods described herein. The graphical element may be used, for example, as a command button on a graphical user interface. As shown in FIG. 4B, an image of the area in front of the display of an electronic device is shown in a simulated reflection of a graphical icon. The image may be distorted based on particular criteria for the graphical element. In the example of FIG. 4B, the particular criteria may be that of a reflective sphere of a particular radius. Thus, the captured image of the area in front of the display may be distorted (e.g., flipped, curved, stretched, or otherwise changing the orientation) to provide the appearance of being reflected in the sphere of the particular radius. Furthermore, the image may be adjusted (e.g., filtered, darkened, lightened, etc.) to simulate the degree of reflectivity of the simulated reflective graphical element. For example, a simulated mirrored surface may have a higher degree of reflectivity than a simulated painted metal surface, and the degree of reflectivity may be accounted for in the simulation. As shown in FIG. 4B, the captured and distorted image may then be applied to the displayed graphical element to provide the appearance of a reflection on a sphere. In some implementations, the captured and distorted image may be updated on a continuous basis or at regular intervals. The simulated reflective graphical element may be used in a variety of applications, including, for example, as widget on a graphical user interface for a touch-sensitive display.

Figure 5:
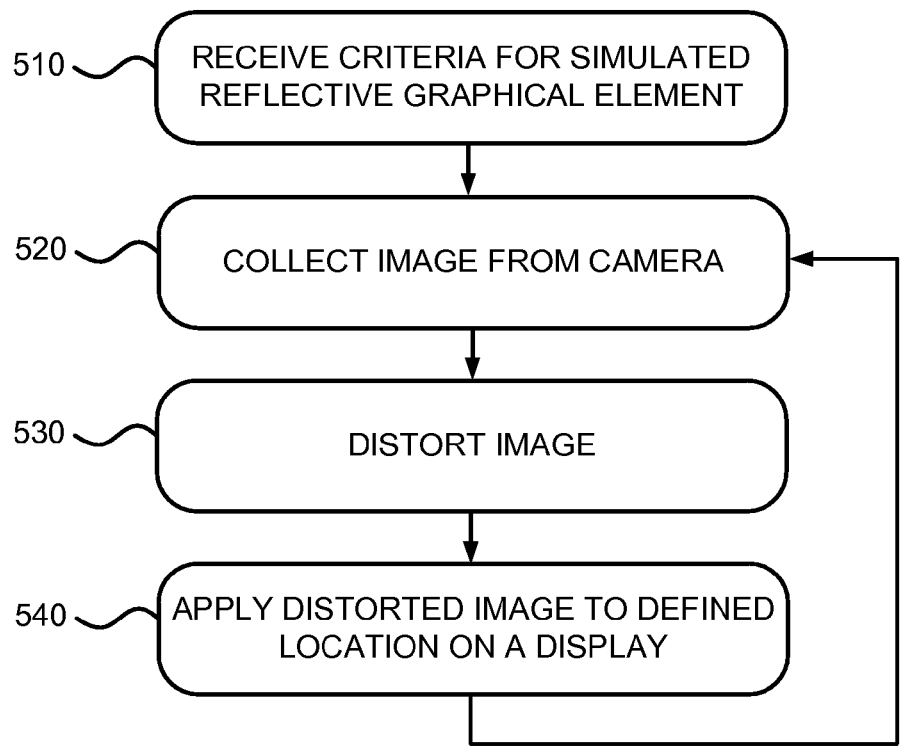
FIG. 5 is a flow diagram illustrating exemplary operations associated with the exemplary electronic device of FIGS. 1 and 2.

FIG. 5 is a flow diagram illustrating exemplary operations associated with electronic device 100 for displaying a simulated reflective image on a display. Criteria for a simulated reflective graphical element may be received (block 510). For example, electronic device 100 may receive instructions from application software or another source of information defining certain criteria for an image to be displayed. The criteria may define characteristics to allow the captured image to simulate reflection from an object.

The image criteria may include the size and geometric shape of the graphical element, simulated lighting conditions, angle of reflection, degree of reflectivity, and the like. For example, the criteria may define a particular geometric size and shape, such as a small sphere. In one implementation, the criteria may include a fixed shape on a stationary position within the display. For example, the criteria may define the shape of a reflective border for a graphical user interface window. In another implementation, the criteria may include multiple states for a single reflective object. For example, a sphere's criteria may include a true spherical dimension in one configuration (e.g., an icon in an unselected state) and at least one slightly compressed dimension in a second configuration (e.g., an icon in a user-selected state). In still another implementation, the criteria may include changing shapes over time. For example, the criteria may define a reflective surface (such an animated character's sunglasses) in a video environment. Thus, the shape and angle of the simulated reflective surface may change with sequential video frames (e.g., corresponding to the simulated movement of the animated character).

An image from a camera may be collected (block 520). For example, camera 270 may capture an image of the area in front of the display of electronic device 100. Images may be in a real-time or near-real time format. In one implementation, captured images may be in digital format. Image resolution for the capture image may be any resolution within the capability of the electronic device. Computer processing speed and memory capacity may be factors in determining the image resolution for particular applications.

The image may be distorted (block 530). The image may be distorted based on criteria provided in an application program. For example, logic within electronic device 100, such as image logic 320, may apply the defined criteria from block 510 to the image captured in block 520.

The distorted image may be applied to a defined location on a display (block 540). For example processing logic 282 may embed the image that was distorted in block 530 in a particular location on display 230, such as embedded on a particular graphical element 235. The location on display 230 may be a defined location based on criteria provided in an application program. The process may then return to block 520 and be repeated from that point until new criteria for a simulated reflective graphical element is provided. The frequency of repetition of blocks 520, 530, and 540 may be based on, for example, the properties of the camera (e.g., the number of frames per second) and the processing capacity of the electronic device 100.

Figure 6:
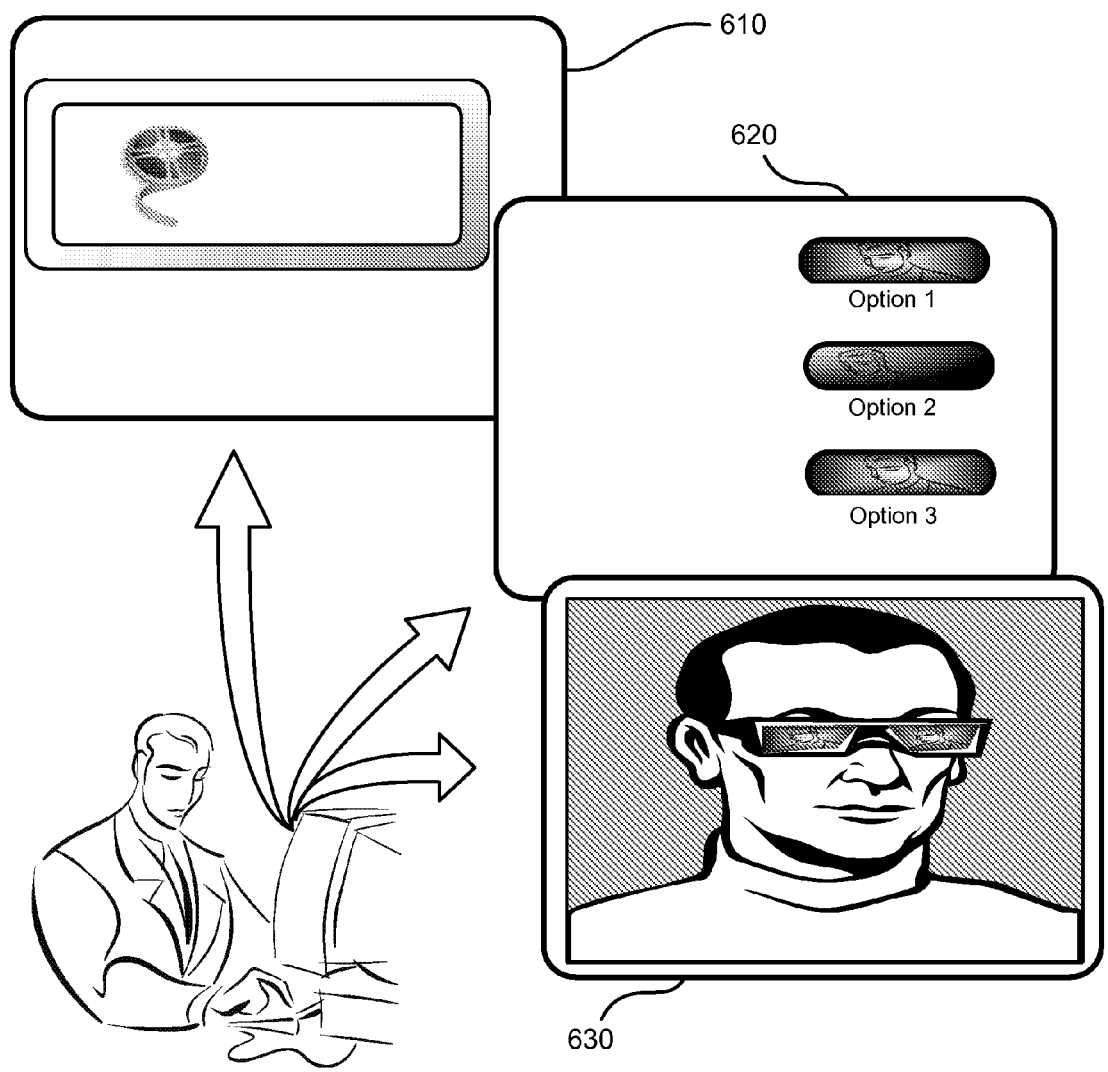
FIG. 6 is a diagram illustrating exemplary simulated reflections on the display of an exemplary electronic device.

FIG. 6 provides a diagram illustrating exemplary simulated reflections on the display of an exemplary electronic device. As shown in FIG. 6, a user sitting in front of a display may see at least a portion of his/her reflection in a reflective graphical element on the display. FIG. 6 provides three exemplary screens 610, 620, and 630 that a user may see according to the methods and systems described herein. In one implementation, shown in screen 610, a simulated reflective graphical element with a fixed shape in a stationary position on the display is provided. The simulated reflective graphical element shown is in the form of a frame for a screen window. A simulated reflection of the user may, thus, appear on the frame.

In another implementation, shown in screen 620, a set of simulated reflective graphical elements with multiple states may be provided. The simulated reflective graphical elements in screen 620 may represent command buttons or other widgets to be selected by user. The icons may have a first state, shown on "Option 1" and "Option 3," corresponding to a first reflective shape. The icons may have a second state, shown on "Option 2," corresponding to a second reflection shape. The first state may, for example, represent an unselected option, while the second state may represent a user's selection. In one implementation, the user's selection may be in the form of a touch on a touch screen, so that the simulated reflection of the selected icon may mimic deformation as a result of the user's touch. In another implementation, the user's selection may be in the form of positioning a pointer over the selected command button and clicking a mouse.

In still another implementation, as shown in screen 630, a simulated reflective graphical element may change shape and/or orientation over time. In screen 630, an animated character includes simulated reflective graphical elements in the character's sun glasses. The character may be, for example, a character in an interactive video game, so that when the character appears to face toward the user (i.e., substantially toward the area directly in front of the display) the user's distorted reflection may appear in the character's sun glasses. Thus, the simulated reflective graphical element may provide a more immersive environment for the user.

Figure 7:
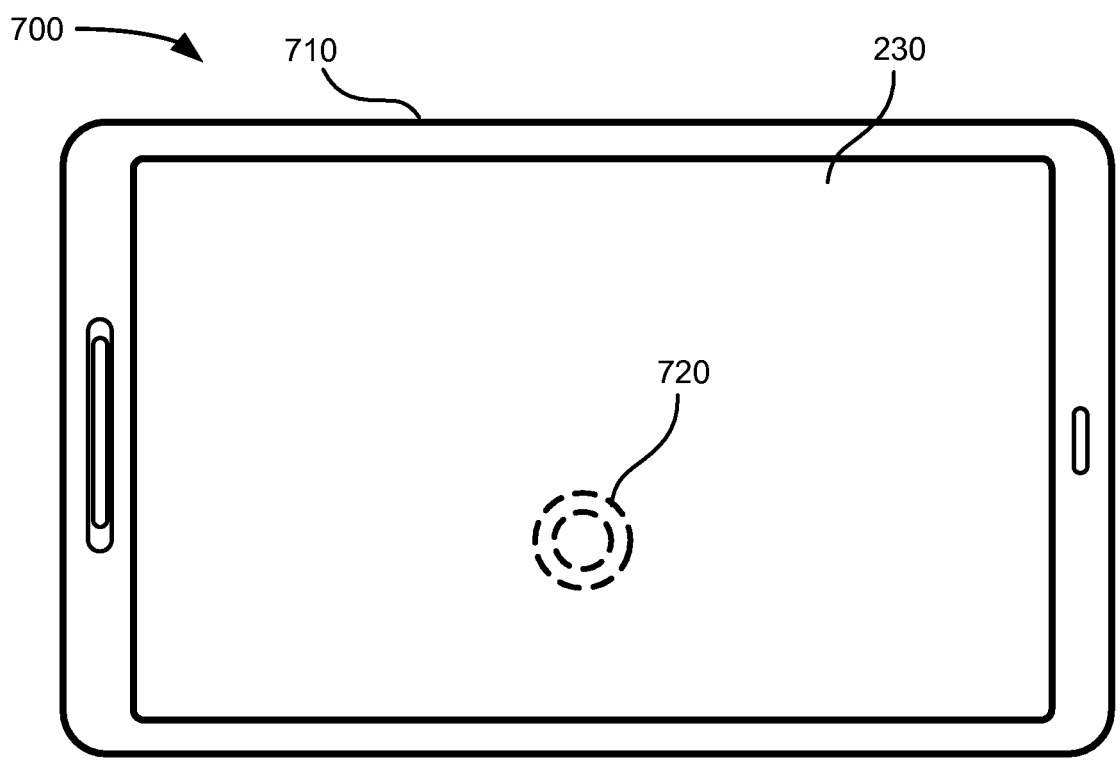
FIG. 7 is a diagram of another exemplary electronic device in which methods and systems described herein may be implemented.

FIG. 7 is a diagram of another exemplary electronic device 700 in which methods and systems described herein may be implemented. Electronic device 700 may include housing 710, camera 720, and display 230. Other components, such as control buttons, a keypad, a microphone, connectivity ports, memory slots, and/or an additional camera, may be located on electronic device 700, including, for example, on a rear or side panel of housing 710. FIG. 7 illustrates camera 720 being integrally located with display 230 on housing 710. More particularly, camera 720 may be located beneath the surface of at least a portion of display 230. In one implementation, camera 720 may be positioned at a location under the display so as to best emulate a reflection of an object from the most common perspective of a user of electronic device 700. Camera 720 may include any image-capture technology providing the ability to collect images of the area in front of display 230 while looking through a portion of display 230.

CONCLUSION

Implementations described herein may use a camera to collect images of what is in front of a computer display and apply the collected images to simulate a reflective surface on a display or a portion thereof. The images may be positioned within a graphical element and/or distorted based on a representative shape of the graphical element to provide the appearance of a reflection off the graphical element.

The foregoing description of the embodiments described herein provides illustration and description, but is not intended to be exhaustive or to limit the invention to the precise form disclosed. Modifications and variations are possible in light of the above teachings or may be acquired from practice of the invention.

For example, implementations have been mainly described in the context of an electronic device. These implementations, however, may be used with any type of device having a display and a camera oriented to capture images. Also, while implementations described herein have been described in the context of a device with an integrated display and camera, other implementations may use a device with separate components that are operatively connected though, for example, a wired or wireless connection.

Further, while a series of blocks has been described with respect to FIG. 5, the order of the blocks may be varied in other implementations. Moreover, non-dependent blocks may be performed in parallel.

Aspects described herein may be implemented in methods and/or computer program products. Accordingly, aspects may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement these aspects is not limiting. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include firmware, hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a device having a camera and a touch screen display, the method comprising:
    receiving, from a user, a selection of a mode to cause the device to present, on the touch screen display, simulated reflective icons;
    identifying, based on receiving the user's selection of the mode, a graphical element being presented on the touch screen display;
    capturing an image of an area in front of the touch screen display;
    determining information for distorting the captured image based on the graphical element, the information including a first reflective shape of the graphical element and a second reflective shape, where the second reflective shape corresponds to simulated deformation of the graphical element as a result of the user's touch;
    distorting the captured image based on the determined information to conform the captured image to simulate a reflection from the first reflective shape;
    displaying the distorted captured image simulating the reflection from the first reflective shape combined with the graphical element on the touch screen display;

receiving a selection, from the user, of the graphical element on the touch screen display;

distorting, in response to the receiving the user's selection of the graphical element, the captured image based on the determined information to conform the captured image to simulate a reflection from the second reflective shape; and displaying the captured image simulating the reflection from the second reflective shape combined with the graphical element on the touch screen display.

2. The method of claim 1, where capturing the image includes periodically capturing still images of the area in front of the touch screen display.

3. The method of claim 1, where capturing the image includes capturing video of the area in front of the touch screen display.

4. The method of claim 1, where distorting, in response to receiving the user's selection of the graphical element, the captured image includes changing an orientation of the captured image to simulate a reflective surface.

5. The method of claim 1, where distorting, in response to receiving the user's selection of the graphical element, the captured image includes applying a degree of reflectivity to the captured image.

6. The method of claim 1, wherein the graphical element is one of a button or a virtual key.

7. A device comprising:

a touch screen display to display information and to receive selections from a user;

a camera to capture an image of an area in front of the touch screen display; and processing logic to:

receive a selection of a mode to cause the device to present, on the touch screen display, simulated reflective icons, identify, based on the selection of the mode, a graphical element being presented on the touch screen display, the graphical element having a first state corresponding to a first reflection shape and a second state corresponding to a second reflection shape;

distort the captured image to the first state to simulate a reflection of the captured image off the first reflection shape;

combine the distorted image and the graphical element to create a first reflective graphical element;

present the first reflective graphical element on the touch screen display;

receive a selection of the first reflective graphical element on the display;

distort, in response to the selection of the first reflective graphical element on the touch screen display, the captured image to the second state to simulate a reflection of the captured image off the second reflection shape;

combine the distorted image and the graphical element to create a second reflective graphical element; and present the second reflective graphical element on the touch screen display.

8. The device of claim 7, where the camera periodically captures still images of the area in front of the touch screen display.

9. The device of claim 7, where the camera captures video of the area in front of the touch screen display.

10. The device of claim 7, where the selection of the graphical element on the touch screen display distorts the graphical element to mimic deformation as a result of the user's touch.

11. The device of claim 7, where an orientation of the captured imaged is changed to simulate a reflective surface.

12. The device of claim 7, further comprising:
a housing, where the camera and the display are located on separate portions of the housing.

13. The device of claim 7, further comprising:
a housing, where the camera is located within the housing underneath a portion of the display.

14. The device of claim 7, wherein the graphical element is one of a button, an icon, or a virtual key that receives user input via the touch screen display.

15. A device comprising:

means for receiving a selection of a mode to cause the device to present, on a touch screen display, simulated reflective icons;

means for identifying a graphical element that has a reflective surface including a first reflective shape and a second reflective shape, where the second reflective shape corresponds to simulated deformation of the graphical element as a result of a user's touch;

means for determining information for distorting the captured image based on the first reflective shape of the graphical element;

means for determining information for distorting the captured image based on the second reflective shape of the graphical element;

means for capturing an image of the area in front of the touch screen display;

means for altering the captured image to emulate a reflection from the first reflective shape of the graphical element from the perspective of the user, where the captured image is altered based on the determined information for distorting the captured image based on the first reflective shape of the graphical element;

means for altering the captured image to emulate a reflection from the second reflective shape of the graphical element from the perspective of the user, where the captured image is altered based on the determined information for distorting the captured image based on the second reflective shape of the graphical element;

means for displaying the altered image, emulating the reflection from the first reflective shape, on the reflective surface of the graphical element when no touch is applied to the graphical element; and means for displaying the altered image, emulating the reflection from the second reflective shape, on the reflective surface of the graphical element when a touch is applied to the graphical element.

16. The device of claim 15, where the captured image is replaced with another captured image at regular intervals.

17. The device of claim 15, where the means for identifying a graphical element include means for determining a first geometric shape and a second geometric shape of the graphical element; and where the means for altering the captured image include means for conforming the captured image to simulate a reflection from the first geometric shape and the second geometric shape.

18. The device of claim 15, where the means for altering the captured image to emulate a reflection from the second reflective shape of the graphical element include means for changing an orientation of the captured image to simulate a reflective surface.

19. The device of claim 15, where the means for altering the captured image to emulate a reflection from the second reflective shape of the graphical element include means for applying a degree of reflectivity to the captured image.

* * * * *